(12) United States Patent
    Chen et al.

(10) Patent No.: US 11,007,513 B2
(45) Date of Patent: May 18, 2021

(54) ZEOLITE SYNTHESIS WITH A FLUORIDE SOURCE

(71) Applicant: Johnson Matthey Public Limited Company, London (GB)

(72) Inventors: Hai-Ying Chen, Wayne, PA (US);
    Joseph Fedeyko, Wayne, PA (US);
    Raul Lobo, Newark, DE (US); Trong Pham, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/929,907

(22) Filed: May 28, 2020

(65) Prior Publication Data

US 2020/0353453 A1    Nov. 12, 2020

Related U.S. Application Data

(63) Continuation of application No. 15/718,002, filed on Sep. 28, 2017, now Pat. No. 10,682,635.

(Continued)

(51) Int. Cl.
    *C01B 39/46*    (2006.01)
    *B01J 29/70*    (2006.01)
    (Continued)

(52) U.S. Cl.
    CPC .......... *B01J 29/7015* (2013.01); *B01D 53/94* (2013.01); *B01D 53/944* (2013.01); *B01D 53/945* (2013.01); *B01D 53/9418* (2013.01); *B01D 53/9422* (2013.01); *B01J 29/70* (2013.01); *B01J 29/7007* (2013.01); *B01J 35/002* (2013.01); *B01J 35/0006* (2013.01); *B01J 35/04* (2013.01); *B01J 35/1023* (2013.01); *B01J 37/0018* (2013.01); *B01J 37/04* (2013.01); *B01J 37/06* (2013.01); *B01J 37/082* (2013.01); *B01J 37/10* (2013.01); *C01B 39/026* (2013.01); *C01B 39/46* (2013.01); *C01B 39/48* (2013.01); *B01D 2255/2092* (2013.01); *B01D 2255/30* (2013.01);

(Continued)

(58) Field of Classification Search
    CPC .............. C01P 2002/60; C01P 2002/82; B01J 29/7015; B01J 29/763; B01D 53/9418; B01D 53/94; B01D 53/945
    See application file for complete search history.

(56) References Cited

U.S. PATENT DOCUMENTS 4,503,024 A    3/1985    Bourgogne et al.
9,901,909 B2    2/2018    Dusselier et al.
(Continued)

FOREIGN PATENT DOCUMENTS

DE    102014117669    6/2015
WO    20121668681 A1    12/2012

OTHER PUBLICATIONS

Eilertsen et al., "Single parameter synthesis of high silica CHA zeolites from fluoride media", Micro and Meso Materials, 2012 (153) pp. 94-99.

(Continued)

*Primary Examiner* — David M Brunsman

(57) ABSTRACT

Provided are novel synthesis techniques for producing pure phase aluminosilicate zeolite and a catalyst comprising the phase pure zeolite in combination with a metal, and methods of using the same.

10 Claims, 6 Drawing Sheets

Related U.S. Application Data

(60) Provisional application No. 62/402,698, filed on Sep. 30, 2016.

(51) Int. Cl.

| | | |
|---|---|---|
| B01D 53/94 | (2006.01) | |
| C01B 39/02 | (2006.01) | |
| B01J 35/00 | (2006.01) | |
| B01J 35/10 | (2006.01) | |
| B01J 35/04 | (2006.01) | |
| B01J 37/00 | (2006.01) | |
| B01J 37/04 | (2006.01) | |
| B01J 37/06 | (2006.01) | |
| B01J 37/08 | (2006.01) | |
| B01J 37/10 | (2006.01) | |
| C01B 39/48 | (2006.01) | |
| F01N 3/08 | (2006.01) | |
| F01N 3/10 | (2006.01) | |
| F01N 3/20 | (2006.01) | |

(52) U.S. Cl.
CPC ...... *B01D 2255/50* (2013.01); *B01D 2255/91* (2013.01); *C01P 2002/72* (2013.01); *C01P 2002/82* (2013.01); *C01P 2004/03* (2013.01); *C01P 2004/61* (2013.01); *F01N 3/0842* (2013.01); *F01N 3/103* (2013.01); *F01N 3/2066* (2013.01); *F01N 2330/02* (2013.01); *F01N 2370/04* (2013.01); *F01N 2570/10* (2013.01); *F01N 2570/12* (2013.01); *F01N 2570/14* (2013.01); *F01N 2570/18* (2013.01)

(56) References Cited

U.S. PATENT DOCUMENTS

| | | | |
|---|---|---|---|
| 10,315,924 | B2 * | 6/2019 | Feyen ................... B01J 20/3057 |
| 10,407,314 | B2 * | 9/2019 | Nakao ................. B01D 53/9418 |
| 10,682,635 | B2 * | 6/2020 | Chen .................... B01J 35/1023 |
| 2007/0100185 | A1 | 5/2007 | Cao et al. |
| 2008/0045767 | A1 | 2/2008 | Cao et al. |
| 2014/0010754 | A1 | 1/2014 | Davis |
| 2014/0315709 | A1 | 10/2014 | Choi et al. |
| 2015/0151287 | A1 | 6/2015 | Rivas-Cardona et al. |
| 2017/0113940 | A1 | 4/2017 | Lobo et al. |

OTHER PUBLICATIONS

Liu et al., "Synthesis of low-silica CHA zeolite chabazite in fluoride media without organic structural directing agents and zeolites", Micro and Meso Materials, 2014 (196) pp. 270-276.

* cited by examiner

ZEOLITE SYNTHESIS WITH A FLUORIDE SOURCE

CROSS REFERENCE TO RELATED APPLICATIONS

This application is a continuation of U.S. application Ser. No. 15/718,002, filed Sep. 28, 2017, now U.S. Pat. No. 10,682,635, which claims priority benefit to U.S. Provisional Application No. 62/402,698, filed Sep. 30, 2016, the entire contents of each of which are incorporated herein by reference.

FIELD OF INVENTION

The present invention relates to a method for synthesizing a zeolite and to the use of such zeolites as catalysts for treating combustion exhaust gas.

DESCRIPTION OF RELATED ART

Zeolites are molecular sieves having unique lattice frameworks constructed of alumina and silica cages. The Internal Zeolite Association (IZA) assigns each unique framework type a three-letter code, such as MOR, CHA, or BEA.

Synthesis of zeolite crystals typically involves reacting alumina and silica in the presence of an organic template (also referred to as a structure directing agent or SDA; similarly, SDA cations can be referred to as $SDA^+$) at elevated temperatures for several days. During crystallization, the alumina and silica co-join to form a crystalline structure around the SDA. The reactants, reaction conditions, and the species of SDA all impact which type or types of framework that are synthesized. When sufficient crystallization has occurred, the crystals are removed from the mother liquor and dried. After the crystals are separated from the mother liquor, the organic SDA is thermally degraded and removed from the crystalline structure, thus leaving a porous molecular sieve.

Zeolites are useful as catalyst for various industrial processes, such as selectively reducing $NO_x$ in combustion exhaust gases. Several zeolites, such as zeolite Beta and ZSM-5, have been identified as being particularly useful for these types of applications. Zeolite catalysts have also been identified as being useful for hydrocarbon cracking and reforming.

Typical zeolites are synthesized in the presence of alkaline metal (e.g., Na and K). However, the presence of the alkaline metal (e.g., Na) can lead to various impurities in final products. For example, when AFX zeolite is synthesized in the presence of $Na^+$, mordenite zeolite can be an impurity in the final product. In addition, these impurities can at times affect the crystalline forms and/or may contain rod-like crystals.

Furthermore, the commercialized hydroxide routes have often involved the use of sacrificial zeolites as the alumina source to hasten the nucleation and growth of a desired framework. Often, the zeotype FAU is used for a portion or all of the alumina present in the final composition. The low density of FAU allows for it to rapidly dissolve or transform in a growth gel into higher density framework types. The limitations with these FAU approaches, though, are often the upper attainable silica-to-alumina mole ratio (SAR) of the product. This SAR is often a direct result of the highest SAR of the FAU material which can be deconstructed during the synthesis. Also, crystals formed during the process are often small and instead large aggregates of these crystals are apparent. Thus, there is still a need for a novel and improved synthesis to produce phase pure zeolites.

SUMMARY OF THE INVENTION

Through intensive research and studies, the inventors have discovered a novel zeolite synthesis technique. Accordingly, one aspect of the present disclosure is directed to a method for making an aluminosilicate zeolite comprising reacting a synthesis gel comprising at least one zeolite, a fluoride source, a structure directing agent, and an optional additional silica source, at a temperature of at least about 100° C. until crystals of the zeolite with a desired framework form. The zeolite in the synthesis gel is a source of both silica and alumina in the synthesis of the metal promoted aluminosilicate zeolite catalyst having a small pore framework.

Another aspect of the present disclosure is directed to an aluminosilicate zeolite comprising at least about 90% phase pure STW framework and a silica-to-alumina molar ratio (SAR) of less than about 100.

Another aspect of the present disclosure is directed to an aluminosilicate zeolite comprising at least about 90% phase pure ITW framework and a silica-to-alumina molar ratio (SAR) of less than about 140.

Another aspect of the present disclosure is directed to an aluminosilicate zeolite comprising at least about 90% phase pure CHA framework, wherein the aluminosilicate zeolite, according to its FT-IR spectrum, has an intensity ratio of less than about 5 between frequencies of about $3730 \text{ cm}^{-1}$ and about $1870 \text{ cm}^{-1}$.

In addition, provided is a catalyst for treating an exhaust gas comprising a pure-phase aluminosilicate zeolite loaded with a metal selected from V, Cr, Mn, Fe, Co, Ni, Cu, Zn, Mo, Ru, Rh, Pd, Ag, W, Re, Os, Ir, Pt, and Au.

Also provided is a method for using such a catalyst to treat an exhaust gas, for example by selectively reducing $NO_x$, by storing $NO_x$, or by oxidizing one or more of CO, hydrocarbons, and $NH_3$. Such catalyst is preferably supported on a wall-flow filter or a honeycomb flow-through support.

BRIEF DESCRIPTION OF THE DRAWING

FIG. 10 is an FT-IR image of a pure phase CHA zeolite as prepared in Example 2a.

DETAILED DESCRIPTION OF THE INVENTION

Figure 1:
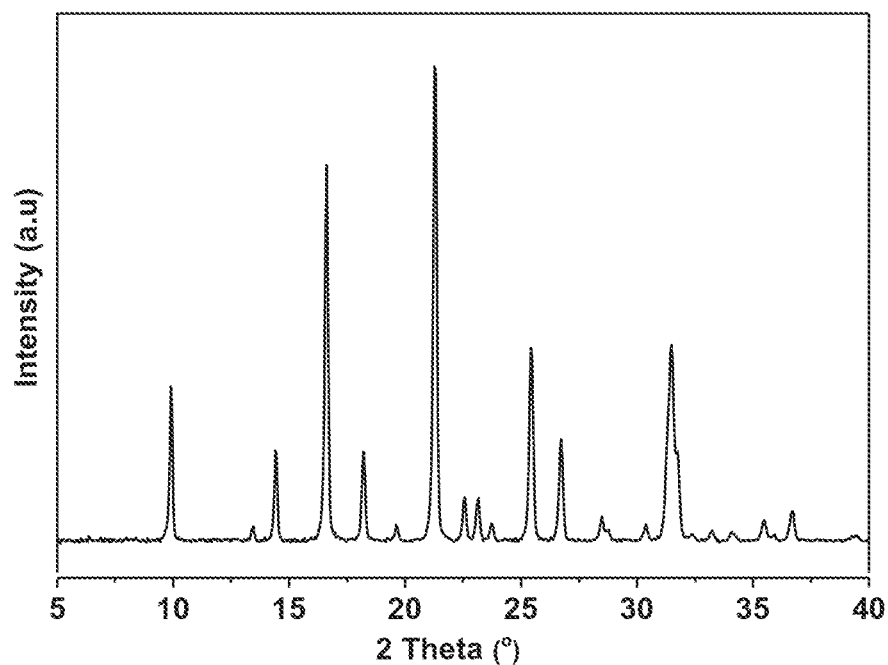
FIG. 1 is an XRD pattern of a pure phase CHA zeolite according to the present invention.

One aspect of the present disclosure is directed to a method for making an aluminosilicate zeolite comprising reacting a synthesis gel comprising at least one zeolite, a fluoride source, a structure directing agent, and an optional additional silica source at a temperature of at least 100° C. until crystals of the zeolite with a desired framework form.

The term "zeolite" refers to an aluminosilicate molecular sieve having a framework composed primarily of alumina and silica moieties, and thus does not include other isotypes such as SAPOs, AlPOs, and the like.

Examples of suitable silica sources include, but are not limited to, silica powders such as Cabosil M5, and tetraalkyl silicates such as tetraethyl orthosilicate (TEOS).

Examples of suitable fluoride sources include, but are not limited to, HF, $NH_4F$, NaF, KF, or a combination thereof.

The zeolite crystals produced by the method can be at least about 90% phase pure.

As used herein, the term "percent" in connection with the zeolite framework means:

$$\text{percent crystallinity} = I_{crystalline}/(I_{crystalline} + I_{amorphous})$$
(I=intensity).

The impurities can be amorphous, different crystalline phases, or different framework types (e.g., undissolved faujasites (FAU), MFI, ITE, AST, and/or MTF).

The aluminosilicate zeolite can contain at least about 95 percent, or even at least about 97 percent of the framework. The aluminosilicate zeolite can be substantially free of other crystalline phases and typically it is not an intergrowth of two or more framework types. As used herein, the term "substantially free" means that the zeolite contains less than about 10, 8, 6, 4, 2, or 1 percent of the named framework impurity or off all the impurities.

The zeolite crystals can have a silica-to-alumina mole ratio (SAR) of at least about 20, 22, 25, or 30.

The reaction step can be performed at a pH less than about 11, about 10, or about 9. The reaction step can be performed under a pH range of about 5 to about 10, or more preferably, about 6 to about 9 or about 6 to about 8.

The zeolite with the desired framework can be selected from the group consisting of a small pore zeolite, a medium pore zeolite, and a large pore zeolite.

As used herein, the term "large pore" means a framework having a maximum ring size of at least 12 tetrahedral atoms, "medium pore" means a framework having a maximum ring size of at least 10 tetrahedral atoms, and the term "small pore" means a framework having a maximum ring size of at least 8 tetrahedral atoms.

The zeolite produced by the methods described herein can be a small pore zeolite. Examples of suitable small pore zeolites include, but are not limited to, AFX, AEI, CHA, LTA, ITW, RTH, LEV, SFW, STT, or IHW. Preferably the small pore zeolite is selected from the group consisting of AFX, AEI, CHA, LTA, ITW, RTH, SFW, and IHW. More preferably the small pore zeolite is selected from the group consisting of AFX, AEI, and CHA. The small pore zeolite can be AFX. The small pore zeolite can be AEI. The small pore zeolite can be CHA.

As used herein, the term "AFX" refers to an AFX framework type as recognized by the International Zeolite Association (IZA) Structure Commission. The term "AEI" refers to an AEI framework type as recognized by the IZA Structure Commission. The term "CHA" refers to an CHA framework type as recognized by the IZA Structure Commission.

The crystals of the small pore zeolite can have a mean crystal size of less than about 5 μm. Typically, the crystals of the small pore zeolite have a mean crystal size of about 0.5 μm to about 5 μm.

The crystal size is based on individual crystals (including twinned crystals) but does not include agglomerations of crystals. Crystal size is the length of longest diagonal of the three dimensional crystal. Direct measurement of the crystal size can be performed using microscopy methods, such as scanning electron microscopy (SEM) or transmission electron microscopy (TEM). For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest diagonal of the individual crystals are measured and recorded. (Particles that are clearly large polycrystalline aggregates should not be included the measurements.) Based on these measurements, the arithmetic mean of the sample crystal sizes is calculated.

The crystals of CHA can have a mean crystal size of less than about 1 μm, 0.9 μm, 0.8 μm, 0.7 μm, 0.6 μm or 0.5 μm. Alternatively, the crystals of CHA can have a mean crystal size of about 50 nm to about 500 nm, about 50 nm to about 300 nm, or about 50 nm to about 200 nm.

The small pore zeolite crystals can have an SAR of about 20 to about 500. The CHA crystals can have an SAR of about 22 to about 500. The ITW crystals can have an SAR of about 60 to about 500. The AFX crystals can have an SAR of about 15 to about 50, about 20 to about 50, or about 15 to about 40. The LTA crystals can have an SAR of about 30 to about 500. The RTH crystals can have an SAR of about 15 to about 40.

The small pore zeolites can be preferably prepared with an organic SDA. Examples of suitable organic SDA cations include, but are not limited to, 1,3-bis(1-adamantyl)imidazolium, N,N-diethyl-cis 2,6-dimethylpiperidium, pentaethylimidazolium, 1,2-dimethyl-3-(4-methylbenzyl)imidazolium, 1,2,3-trimethylimidazolium, N,N,N-1-trimethyladamantammonium, N,N,N-dimethylethylcyclohexylammonium, or a combination thereof. Preferably the SDA cation is selected from the group consisting of 1,3-bis(1-adamantyl)imidazolium, N,N-diethyl-cis 2,6-dimethylpiperidium, N,N,N-1-trimethyladamantammonium, and N,N,N-dimethylethylcyclohexylammonium. The SDA cation can be 1,3-bis(1-adamantyl)imidazolium. The SDA can be N,N-diethyl-cis 2,6-dimethylpiperidium. The SDA cation can be N,N,N-1-trimethyladamantammonium, N,N,N-dimethylethylcyclohexylammonium, or a combination thereof.

The SDA cation of the present disclosure is typically associated with anions which can be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like.

The zeolite produced by the methods of synthesis as described herein can be a medium pore zeolite. Examples of suitable medium pore zeolite include, but are not limited to, MFI, STW, MWW, ITH, and MEL.

The crystals of the medium pore zeolite can have a mean crystal size of less than about 5 μm. Typically, the crystals of the medium pore zeolite have a mean crystal size of about 0.5 μm to about 5 μm.

The medium pore zeolite crystals can have an SAR of about 20 to about 500. The MFI crystals can have an SAR of about 25 to about 500. The STW crystals can have an SAR of about 100 to about 500.

The medium pore zeolites can be preferably prepared with an organic SDA. Examples of suitable organic SDA cations include, but are not limited to, tetrapropylammonium, 2-ethyl-1,3,4-trimethylimidazolium, trimethyladamantammonium, hexamethyleneimine, hexamethonium, tetrabutylammonium, or a combination thereof. The SDA cation is can be tetrapropylammonium. The SDA cation can be 2-ethyl-1,3,4-trimethylimidazolium. The SDA cation can be trimethyladamantammonium, hexamethyleneimine or a combination thereof. The SDA cation can be hexamethonium. The SDA cation can be tetrabutylammonium.

The zeolite produced by the methods of synthesis as described herein can be a large pore zeolite. Examples of suitable large pore zeolites include, but are not limited to, BEA, ISV. Preferably the large pore zeolite is BEA.

The crystals of the large pore zeolite can have a mean crystal size of less than about 5 μm. Typically, the crystals of the large pore zeolite have a mean crystal size of about 0.5 μm to about 5 μm.

The large pore zeolite crystals can have an SAR of about 20 to about 500.

The large pore zeolites can be preferably prepared with an organic SDA. Examples of suitable organic SDA cations include, but are not limited to, tetraethylammonium, 1,3,3-trimethyl-6-azoniumtricyclo[3.2.1.4$^{6,6}$]dodecane, or a combination thereof. Typically, the SDA cation is tetraethylammonium. Alternatively the SDA cation is 1,3,3-trimethyl-6-azoniumtricyclo[3.2.1.4$^{6,6}$]dodecane.

The SDA, at least one zeolite and an optional additional silica source can be mixed as prepared as a synthesis gel. The at least one zeolite can be ammonium-form zeolites or hydrogen-form zeolites (e.g., NH$_4$-form zeolite Y, H-form zeolite Y). Examples of the at least one zeolite include, but are not limited to, zeolite Y (e.g., CBV712, CBV720, CBV760, CBV780, HSZ-HUA385, and HSZ-HUA390). Preferably the at least one zeolite is zeolite Y. More preferably zeolite Y has an SAR of about 12 to about 500.

The at least one zeolite can have a lower framework density than the aluminosilicate zeolite. The framework density is defined as the number of T-atoms/1000 Å$^3$.

The at least one zeolite can also be the only silica and aluminum source to form the aluminosilicate zeolite.

The at least one zeolite can comprise two or more zeolites. Typically, the two or more zeolites are zeolites Y having different silica-to-alumina molar ratios.

The synthesis gel of the methods of synthesis as described above can be substantially free of alkaline metal. Typically, the synthesis gel comprises less than about 4, 3, 2, or 1% of the alkaline metal. Preferably the alkaline metal is Na. Unless otherwise specified, all compositional percentages used herein are based on weight of the dried power, not slurry.

The SAR is based on the synthesized zeolite crystal and not the starting synthesis gel. The silica-to-alumina ratio of zeolites can be determined by conventional analysis. This ratio is meant to represent, as closely as possible, the ratio in the rigid atomic framework of the zeolite crystal and to exclude silicon or aluminum in the binder or in cationic or other form within the channels. Since it may be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

To improve selectivity for the framework and/or to shorten the crystallization process, the reaction mixture can be seeded with the crystals having the desired framework. The crystals having the desired framework can also be allowed to nucleate spontaneously from the reaction mixture. Alternatively, the synthesis is conducted in the absence of the seeded crystals having the desired framework.

The synthesis gel of the methods of synthesis as described above can further comprise a second structure directing agent. Examples of suitable second SDA cations include, but are not limited to, tetramethlammonium, N,N,N-dimethylethylcyclohexylammonium, isopropylamine, or trimethylamine.

The synthesis gel of the methods of synthesis as described above can have a molar ratio of SDA$_2$O/SiO$_2$ of at least about 3. The synthesis gel can preferably have one or more of the following molar compositional ratios:
  SiO$_2$/Al$_2$O$_3$ of about 12 to about 500;
  SDA$_2$O/Al$_2$O$_3$ of about 3 to about 125;
  H$_2$O/Al$_2$O$_3$ of about 30 to about 7500;
  OH$^-$/SiO$_2$ of about 0.4 to about 0.6; and/or
  F$^-$/SiO$_2$ of about 0.4 to about 0.6.

The molar ratio of the OH$^-$/SiO$_2$ of the synthesis gel above can also be about 0.45 to about 0.6, or about 0.5.

The molar ratio of the F$^-$/SiO$_2$ of the synthesis gel above can also be about 0.45 to about 0.6, or about 0.5.

The synthesis gel is heated to a temperature greater than 100° C., for example about 120 to about 180° C., or about 140 to about 160° C., for a period of time sufficient to form zeolite crystals. The hydrothermal crystallization process is typically conducted under pressure, such as in an autoclave, and is preferably under autogenous pressure. The reaction mixture can be stirred during crystal formation. The reaction time is typically about 1 to about 15 days, for example, about 4 to about 8 days.

Once crystals of the desired framework have formed, the solid product can be separated from the mother liquor by standard mechanical separate techniques, such as filtration. The recovered solid product is then washed and dried. The crystals can be thermally treated to remove the SDA, thus providing the aluminosilicate zeolite product. The aluminosilicate zeolite crystals can also be calcined.

Another aspect of the present disclosure is directed to an aluminosilicate zeolite comprising at least about 90% phase pure ITW framework and a silica-to-alumina molar ratio (SAR) of less than about 140.

The aluminosilicate zeolite can have an SAR of about 60 to about 140. The aluminosilicate zeolite can also have a mean crystal size of about 0.5 μm to about 5 μm.

The aluminosilicate zeolite can comprise at least about 95% or about 97% phase pure ITW framework. The aluminosilicate zeolite can be substantially free of alkaline metal.

Another aspect of the present disclosure is directed to an aluminosilicate zeolite comprising at least about 90% phase pure STW framework and a silica-to-alumina molar ratio (SAR) of less than about 100.

The aluminosilicate zeolite can have an SAR of about 80 to about 100.

The aluminosilicate zeolite can have a mean crystal size of about 0.5 µm to about 5 µm.

The aluminosilicate zeolite can comprise at least about 95% or about 97% phase pure STW framework. The aluminosilicate zeolite can be substantially free of alkaline metal.

Figure 10:
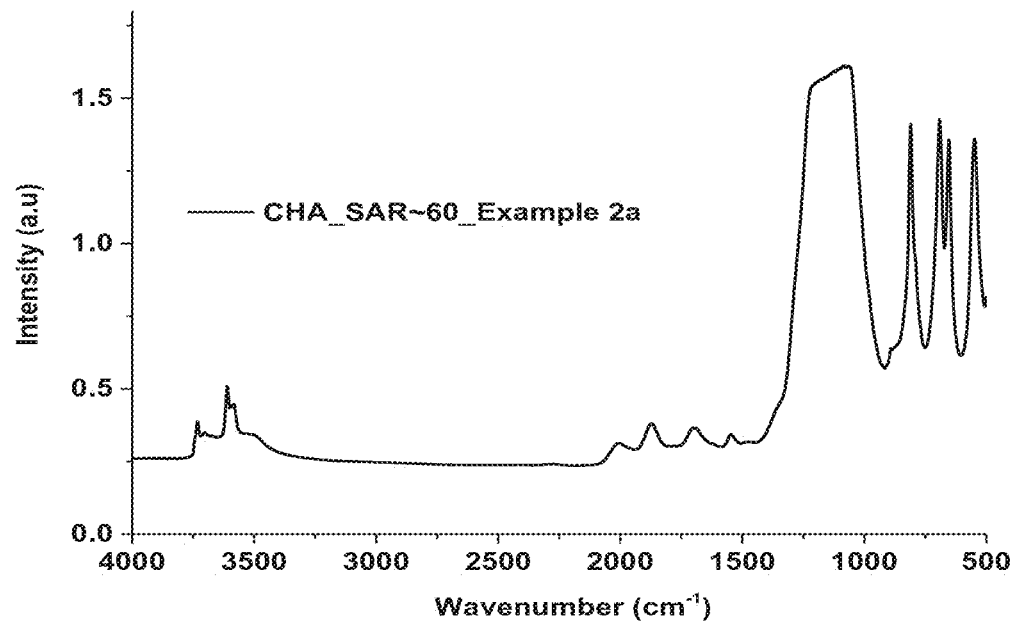

Another aspect of the present disclosure is directed to an aluminosilicate zeolite comprising at least about 90% phase pure CHA framework and having an FT-IR spectrum according to FIG. 10.

As shown in FIG. 10, The CHA has a peak at about 3700-3730 $cm^{-1}$ due to the vibration modes of isolated silanol groups (internal and external surfaces). These silanol groups are sometime referred to as silanol defects, which can be the causes for lower hydrothermal stability of catalysts and catalyst deactivations [e.g., faster deactivation of methanol to olefin (MTO) reactions, significant decreases in the catalysts' activities, especially in aqueous solution reactions, such as isomerization of glucose, etc.]

Figure 11:
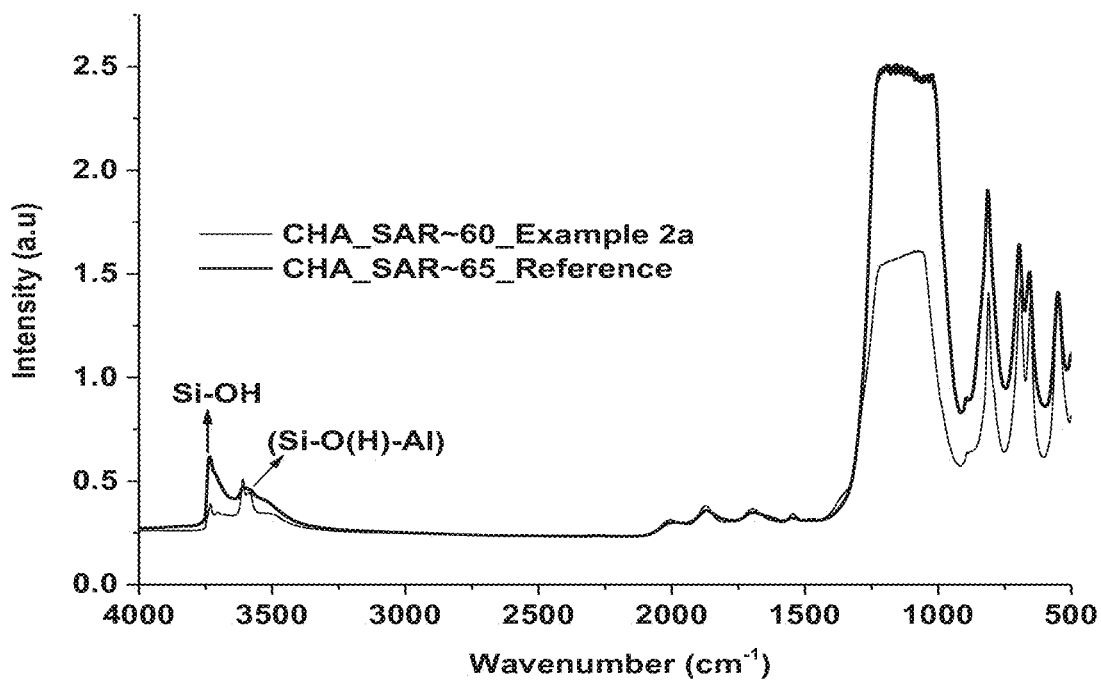
FIG. 11 is a comparison of FT-IR images of a pure phase CHA zeolite used as a reference CHA zeolite.

In comparison, IR spectra of CHA (SAR-60, Example 2a) and CHA (SAR-65, prepared in alkaline medium) were normalized using the framework vibrational overtones at 1870 $cm^{-1}$ (see FIG. 11). Then, the areas of Si—OH peaks at 3700-3730 $cm^{-1}$ of the two samples were calculated and gave ratio of Si—OH (CHA, Example 2a)/Si—OH (CHA, OH$^-$ medium)~1/5. The CHA zeolite of the present invention has significant less silanol defects (e.g., 2-10 times less) compared to the reference CHA prepared in alkaline medium.

Yet another aspect of the present disclosure is directed to an aluminosilicate zeolite comprising at least about 90% phase pure CHA framework, wherein the aluminosilicate zeolite, according to its FT-IR spectrum, has an intensity ratio of less than about 5 between frequencies of about 3730 $cm^{-1}$ and about 1870 $cm^{-1}$.

The aluminosilicate zeolite, according to its FT-IR spectrum, can have the intensity ratio of less than about 4, 3, 2, or 1 between frequencies of about 3730 $cm^{-1}$ and about 1870 $cm^{-1}$.

The aluminosilicate zeolite can also have the intensity ratio ranges of about 1:10 to about 5:1, about 1:5 to about 4:1, or about 1:2 to about 2:1, between frequencies of about 3730 $cm^{-1}$ and about 1870 $cm^{-1}$.

The aluminosilicate zeolite can have a mean crystal size of less than about 3 µm, about 2 µm, or about 1 µm. Alternatively, the crystals can have a mean crystal size of less than about 1 µm, 0.9 µm, 0.8 µm, 0.7 µm, 0.6 µm or 0.5 µm, or the crystals can have a mean crystal size of about 50 nm to about 500 nm, about 50 nm to about 300 nm, or about 50 nm to about 200 nm.

The aluminosilicate zeolite can have an SAR of about 20 to about 500 or about 22 to about 500.

The aluminosilicate zeolite can comprise at least about 95% or about 97% a phase pure framework, such as AFX, AEI, CHA, LTA, ITW, RTH, LEV, STT, SFW, IHW, MFI, STW, MWW, ITH, MEL, BEA or ISV.

The aluminosilicate zeolite can also be substantially free of alkaline metal.

The aluminosilicate (e.g., CHA, LTA, RTH, ITW, AEI, AFX) zeolite can be used as a catalyst for various processes, such as treatment of combustion exhaust gas, hydrocarbon cracking, and conversion of MTO, or conversion of methane to methanol. Treatable exhaust gases include those generated by lean burn combustion, such as exhaust from diesel engines, gas turbines, power plants, lean burn gasoline engines, and engines burning alternative fuels such as methanol, CNG, and the like. Other treatable exhaust gases include those generated by rich burn engines, such as gasoline engines. The aluminosilicate zeolites can also be used in other chemical processes such as water treatment and/or purification.

A catalyst for hydrocarbon cracking can comprise a pure phase aluminosilicate zeolite obtainable or obtained from the synthesis described above.

A catalyst for MTO conversion can comprise a pure phase aluminosilicate zeolite obtainable or obtained from the synthesis described above.

A catalyst for methane to methanol conversion can comprise a pure phase aluminosilicate zeolite obtainable or obtained from the synthesis described above.

A catalyst for water treatment and/or purification can comprise a pure phase aluminosilicate zeolite obtainable or obtained from the synthesis described above.

For the abovementioned processes, the aluminosilicate zeolite is preferably used in heterogeneous catalytic reaction systems (i.e., solid catalyst in contact with a gas reactant). To improve contact surface area, mechanical stability, and/or fluid flow characteristics, the catalysts can be disposed on and/or within a large surface area substrate, such a porous substrate. Typically, a washcoat containing the catalyst is applied to an inert substrate, such as corrugated metal plate, pellets, a flow-through honeycomb cordierite or aluminatitanate (AT) brick), or a honeycomb wall-flow filter. Alternatively, the catalyst can be kneaded along with other components such as a filler, a binder, and a reinforcing agent, into an extrudable paste which is then extruded through a die to form a honeycomb brick.

Accordingly, the invention also provides a catalyst article comprising a metal-promoted AEI zeolite catalyst described herein coated on and/or incorporated into a substrate.

Small pore (e.g., CHA, LTA, RTH, ITW, AEI, AFX) zeolites according to the present invention when used in combination with a promoter metal. Promoter metal should be broadly interpreted and specifically includes copper, nickel, zinc, iron, tungsten, molybdenum, cobalt, titanium, zirconium, manganese, chromium, vanadium, niobium, as well as tin, bismuth, and antimony; platinum group metals, such as ruthenium, rhodium, palladium, indium, platinum, and precious metals such as gold and silver. Preferred transition metals are base metals, and preferred base metals include those selected from the group consisting of chromium, manganese, iron, cobalt, nickel, and copper, and mixtures thereof. Preferably at least one of the promoter metals is copper. Other preferred promoter metals include iron, particularly in combination with copper. Preferred metals for converting hydrocarbons and selective reduction of $NO_x$ in exhaust gas include Cu and Fe. Particularly useful metals for oxidizing CO, hydrocarbons, and/or ammonia are Pt and Pd.

The metal used in combination with the small pore (e.g., CHA, LTA, RTH, ITW, AEI, AFX) zeolite is preferably a promoter metal disposed on and/or within the zeolite material as extra-framework metals. As used herein, an "extra-framework metal" is one that resides within the molecular sieve and/or on at least a portion of the molecular sieve surface, preferably as an ionic species, does not include aluminum, and does not include atoms constituting the framework of the molecular sieve. Preferably, the presence of the promoter metal(s) facilitates the treatment of exhaust gases, such as exhaust gas from a diesel engine, including processes such as $NO_x$ reduction, $NH_3$ oxidation, and $NO_x$ storage.

The promoter metal can be present in the zeolite material at a concentration of about 0.1 to about 10 weight percent (wt %) based on the total weight of the zeolite (without SDA), for example from about 0.5 wt % to about 5 wt %, from about 0.5 to about 1 wt %, from about 1 to about 5 wt %, about 2.5 wt % to about 3.5 wt %. When the promoter metal is copper, iron, or the combination thereof, the concentration of these transition metals in the zeolite material is preferably about 1 to about 5 weight percent, more preferably about 2.5 to about 3.5 weight percent.

The promoter metal can be present in an amount relative to the amount of aluminum in the zeolite, namely the framework aluminum. As used herein, the promoter metal: aluminum (M:Al) ratio is based on the relative molar amount of promoter metal to molar framework Al in the corresponding zeolite. Typically the catalyst material has a M:Al ratio of about 1:10 to about 1:1, preferably about 1:5 to about 1:2. An M:Al ratio of about 1:5 to about 1:2 is particularly useful where M is copper, and more particularly where M is copper and the SAR of the zeolite is about 20 to about 25.

Preferably, incorporation of Cu occurs during synthesis or after, for example, by ion exchange or impregnation. In one example, a metal-exchanged zeolite is synthesized within an ionic copper mixture. The metal-exchanged zeolite can then be washed, dried, and calcined.

Generally, ion exchange of the catalytic metal cation into or on the molecular sieve can be carried out at room temperature or at a temperature up to about 80° C. over a period of about 1 to about 24 hours at a pH of about 3 to about 7. The resulting catalytic molecular sieve material is preferably dried at about 80 to about 120° C. overnight and calcined at a temperature of at least about 500° C.

The catalyst composition can comprise the combination of at least one promoter metal and at least one alkali or alkaline earth metal, wherein the transition metal(s) and alkali or alkaline earth metal(s) are disposed on or within the zeolite material. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. Typically, alkali metals are preferred. Alternatively, alkaline earth metals are preferred. Preferred alkali or alkaline earth metals include calcium, potassium, and combinations thereof.

The catalyst composition can be essentially free of magnesium and/or barium.

The catalyst can be essentially free of any alkali or alkaline earth metal except calcium and potassium.

The catalyst can be essentially free of any alkali or alkaline earth metal except calcium.

The catalyst can be essentially free of any alkali or alkaline earth metal except potassium.

As used herein, the term "essentially free" with respect to metal means that the material does not have an appreciable amount of the particular metal. That is, the particular metal is not present in amount that would affect the basic physical and/or chemical properties of the material, particularly with respect to the material's capacity to selectively reduce or store $NO_x$.

The zeolite material can also have a post-synthesis alkali/alkali-earth content of less than 3 weight percent, more preferably less than 1 weight percent, and even more preferably less than about 0.1 weight percent. Here, post-synthesis alkali content refers to the amount of alkali/alkali-earth metal occurring in the zeolite as a result of synthesis (i.e., alkali/alkali-earth derived from the synthesis starting materials) and does not include alkali/alkali-earth metal added after synthesis. Typically, alkali/alkali-earth metal can be added after synthesis to work in combination with the promoter metal.

The metal promoted zeolite catalysts of the present invention can also contain a relatively large amount of cerium (Ce). Typically, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. Typically, the cerium concentration in the catalyst material is about 50 to about 550 $g/ft^3$. Other ranges of Ce include: above 100 $g/ft^3$, above 200 $g/ft^3$, above 300 $g/ft^3$, above 400 $g/ft^3$, above 500 $g/ft^3$, from about 75 to about 350 $g/ft^3$, from about 100 to about 300 $g/ft^3$, and from about 100 to about 250 $g/ft^3$.

Certain aspects of the invention provide a catalytic washcoat. The washcoat comprising the small pore (e.g., CHA, LTA, RTH, ITW, AEI, AFX) zeolite catalyst described herein is preferably a solution, suspension, or slurry. Suitable coatings include surface coatings, coatings that penetrate a portion of the substrate, coatings that permeate the substrate, or some combination thereof.

In general, the production of an extruded solid body containing the metal promoted catalyst involves blending the small pore (e.g., CHA, LTA, RTH, ITW, AEI, AFX) zeolite and the promoter metal (either separately or together as a metal-exchanged zeolite), a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A metal-promoted small pore (e.g., CHA, LTA, RTH, ITW, AEI, AFX) zeolite catalyst can also be washcoated or otherwise applied to the extruded solid body as one or more sub-layers that reside on the surface or penetrate wholly or partly into the extruded solid body. Alternatively, a metal-promoted small pore (e.g., CHA, LTA, RTH, ITW, AEI, AFX) zeolite can be added to the paste prior to extrusion.

Extruded solid bodies containing metal-promoted small pore (e.g., CHA, LTA, RTH, ITW, AEI, AFX) zeolites according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the metal-promoted small pore (e.g., CHA, LTA, RTH, ITW, AEI, AFX) zeolite is dispersed throughout, preferably evenly throughout, the entire extruded catalyst body.

Where any of the above extruded solid bodies are made into a wall-flow filter, the porosity of the wall-flow filter can be from 30-80%, such as from 40-70%. Porosity and pore volume can be measured e.g. using mercury intrusion porosimetry.

The metal-promoted small pore (e.g., CHA, LTA, RTH, ITW, AEI, AFX) catalyst described herein can promote the reaction of a reductant, preferably ammonia, with nitrogen oxides to selectively form elemental nitrogen ($N_2$) and water ($H_2O$). Typically, the catalyst can be formulated to favor the reduction of nitrogen oxides with a reductant (i.e., an SCR catalyst). Examples of such reductants include hydrocarbons (e.g., $C_3$-$C_6$ hydrocarbons) and nitrogenous reductants such as ammonia and ammonia hydrazine or any suitable ammonia precursor, such as urea (($NH_2)_2CO$), ammonium carbonate, ammonium carbamate, ammonium hydrogen carbonate or ammonium formate.

The metal-promoted small pore (e.g., CHA, LTA, RTH, ITW, AEI, AFX) catalyst described herein can also promote the oxidation of ammonia. The catalyst can be formulated to favor the oxidation of ammonia with oxygen, particularly a concentrations of ammonia typically encountered downstream of an SCR catalyst. The metal-promoted small pore (e.g., CHA, LTA, RTH, ITW, AEI, AFX) zeolite catalyst can be used in an ammonia slip catalyst (ASC) along with an ammonia oxidation (AMOX) catalyst. Typically, the metal-promoted small pore zeolite catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

SCR and AMOX operations can be performed in series, wherein both processes utilize a catalyst comprising the metal-promoted small pore (e.g., CHA, LTA, RTH, ITW, AEI, AFX) zeolite described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. Typically, a catalyst article having an ammonia slip catalyst is disposed downstream of a selective catalytic reduction (SCR) catalyst. The ammonia slip catalyst oxidizes at least a portion of any nitrogenous reductant that is not consumed by the selective catalytic reduction process. Typically, the ammonia slip catalyst is disposed on the outlet side of a wall flow filter and an SCR catalyst is disposed on the upstream side of a filter. Alternatively, the ammonia slip catalyst is disposed on the downstream end of a flow-through substrate and an SCR catalyst is disposed on the upstream end of the flow-through substrate. The ammonia slip catalyst and SCR catalyst can be disposed on separate substrates (bricks) within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

The SCR and/or AMOX process can be performed at a temperature of at least 100° C. The process(es) can occur at a temperature from about 150° C. to about 750° C. Preferably the temperature range is from about 175 to about 550° C. More preferably the temperature range is from about 175 to about 400° C. Alternatively, the temperature range is about 450 to about 900° C., preferably about 500 to about 750° C., about 500 to about 650° C., about 450 to about 550° C., or about 650 to about 850° C. Temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_X$ compounds and/or oxidation of $NH_3$ in an exhaust gas, which comprises contacting the exhaust gas with a catalyst described herein in the presence of a reducing agent for a time sufficient to reduce the level of $NO_X$ compounds in the gas. These methods can further comprise one or more of the following steps: (a) accumulating and/or combusting soot that is in contact with the inlet of a catalytic filter; (b) introducing a nitrogenous reducing agent into the exhaust gas stream prior to contacting the catalyst in an SCR filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, can be used to oxidize particulate matter in particulate filter; and/or reduce the particulate matter (PM) in the exhaust gas; and (e) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All or at least a portion of the nitrogen-based reductant, particularly $NH_3$, for consumption in the SCR process can be supplied by a $NO_X$ adsorber catalyst (NAC), a lean $NO_X$ trap (LNT), or a $NO_X$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as about 20 to about 60 $g/ft^3$. Alternatively, the precious metal of the catalyst is characterized by the average concentration which can be from about 40 to about 100 $grams/ft^3$.

Under certain conditions, during the periodically rich regeneration events, $NH_3$ can be generated over a $NO_x$ adsorber catalyst. The SCR catalyst downstream of the $NO_x$ adsorber catalyst can improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method can also be used to treat gas from industrial processes such as refining, from refinery heaters and boilers, furnaces, the chemical processing industry, coke ovens, municipal waste plants and incinerators, etc. Typically, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the metal-promoted small pore (e.g., CHA, LTA, RTH, ITW, AEI, AFX) zeolite described herein and at least one additional component for treating the exhaust gas, wherein the catalytic article and at least one additional component are designed to function as a coherent unit. The system can comprise a catalytic article comprising a metal-promoted small pore (e.g., CHA, LTA, RTH, ITW, AEI, AFX) zeolite described herein, a conduit for directing a flowing exhaust gas, a source of nitrogenous reductant disposed upstream of the catalytic article.

The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$.

The system can comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. The at least one platinum group metal can be platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

The metal-promoted zeolite (e.g., small pore zeolite, medium pore zeolite, and/or large pore zeolite) catalyst described herein can also be a passive NOx absorber (PNA) catalyst (i.e. it has PNA activity). Such catalyst can be prepared according to the method described in WO 2012/166868 (also published as U.S. 2012308439) (both of which are hereby incorporated by reference), and the promoter metal can comprise a noble metal.

The noble metal is typically selected from the group consisting of palladium (Pd), platinum (Pt), rhodium (Rh), gold (Au), silver (Ag), iridium (Jr), ruthenium (Ru) and mixtures of two or more thereof. Preferably, the noble metal is selected from the group consisting of palladium (Pd), platinum (Pt) and rhodium (Rh). More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, or consists of, palladium (Pd) and optionally a second metal selected from the group consisting of platinum (Pt) and rhodium (Rh). More preferably, the noble metal comprises, or consists of, palladium (Pd) and optionally platinum (Pt). Even more preferably, the catalyst comprises palladium as the only noble metal.

When the noble metal comprises, or consists of, palladium (Pd) and a second metal, then the ratio by mass of palladium (Pd) to the second metal is >1:1. Preferably, the ratio by mass of palladium (Pd) to the second metal is >1:1 and the molar ratio of palladium (Pd) to the second metal is >1:1. The aforementioned ratio of palladium relates to the amount of palladium present as part of the PNA catalyst. It does not include any palladium that may be present on the support material. The PNA catalyst can further comprise a base metal. Thus, the PNA catalyst may comprise, or consist essentially of, a noble metal, a small pore zeolite as described herein and optionally a base metal.

The base metal can be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the PNA catalyst can be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the PNA catalyst may not comprise a base metal.

In general, it is preferred that the PNA catalyst does not comprise a base metal. It can be preferable that the PNA catalyst is substantially free of barium (Ba), more preferably the PNA catalyst is substantially free of an alkaline earth metal. Thus, the PNA catalyst may not comprise barium, preferably the PNA catalyst does not comprise an alkaline earth metal.

Although the description above contains many specifics, these are merely provided to illustrate the invention and should not be constructed as limitations of the invention's scope. It should be also noted that many specifics could be combined in various ways in a single or multiple embodiments. Thus it will be apparent to those skilled in the art that various modifications and variations can be made in the processes, catalysts, and methods of the present invention without departing from the spirit or scope of the invention.

EXAMPLES

Materials produced in the examples described below were characterized by one or more of the following analytic methods. Powder X-ray diffraction (PXRD) patterns were collected on a X'pert (Philips) or Bruker D8 powder diffractometer using a CuKα radiation (40-45 kV, 40 mA) at a step size of 0.04° and a 1 s per step between 5° and 40° (2θ). Scanning electron microscopy (SEM) images and chemical compositions by energy-dispersive X-ray spectroscopy (EDX) were obtained on a JSM7400F microscope (JEOL) with an accelerating voltage of 3-10 KeV. The micropore volume and surface area were measured using $N_2$ at 77 K on a 3Flex surface characterization analyzer (Micromeritics). The IR experiments were performed in transmission mode with a FTIR Nicolet iS50 spectrometer (spectra range 4000-600 $cm^{-1}$). The zeolites under IR study were measured in the form of thin films deposited on a tungsten grid.

Reagents:
Zeolite Y [CBV712 (SAR=12), CBV720 (SAR~30-32), CBV760 (SAR~60), CBV780 (SAR~80) from Zeolyst; and HSZ-HUA385 (SAR~100), HSZ-HUA390 (SAR~500) from Tosoh], trimethyladamantylammonium Hydroxide (TMAda-OH, Sachem, 25% wt), tetrapropylammonium hydroxide (TPA-OH, Sachem, 40% wt), tetraethylammonium hydroxide (TEA-OH, 35% wt, Alfa Aesar), HF (48%, Fisher Scientific), 1,2,3-trimethylimidazolium hydroxide (1,2,3TMI-OH, 21% wt), 2-ethyl-1,3,4-trimethylimidazolium (2E134TMI-OH, 19.2% wt).

Example 1: Synthesis of CHA Via CBV720

11.6 g of TMAda-OH, 25 wt % was mixed with 1.65 g of zeolite Y (CBV 720, Zeolyst) having an SAR of ~30-32. The mixture was then heated to about 70° C. to evaporate ~7.5 g $H_2O$. Finally, 0.57 g HF (48%) was added dropwise to the concentrated gel mixture and the mixture was stirred by a spatula until homogenous. The mixture was then heated at 155° C. under rotation (45 rpm) for 4 days. The pH range of the reaction mixture was about 6 to about 8.

To obtain the CHA powder product, the autoclaves were cooled to room temperature in air and the crystalline product was recovered by filtration, washed several times with deionized water and dried at 80° C. overnight in a drying oven. The as-made product was calcined at 580° C./8 hours in air with ramping rate of 3° C./min. Analysis of the as made and calcined products by powder XRD indicated that the product had a CHA structure.

Example 2a: Synthesis of CHA Via CBV760

11.6 g of TMAda-OH, 25 wt % was mixed with 1.65 g of zeolite Y (CBV 760, Zeolyst) having an SAR of ~60. The mixture was then heated to about 70° C. to evaporate ~7.5 g $H_2O$. Finally, 0.57 g HF (48%) was added dropwise to the concentrated gel mixture and the mixture was stirred by a spatula until homogenous. The mixture was then heated at 155° C. under rotation (45 rpm) for 4 days. The pH range of the reaction mixture was about 6 to about 8.

To obtain the CHA powder product, the autoclaves were cooled to room temperature in air and the crystalline product was recovered by filtration, washed several times with deionized water and dried at 80° C. overnight in a drying oven. The as-made product was calcined at 580° C. for 8 hours in air with ramping rate of 3° C./min.

Figure 2A:
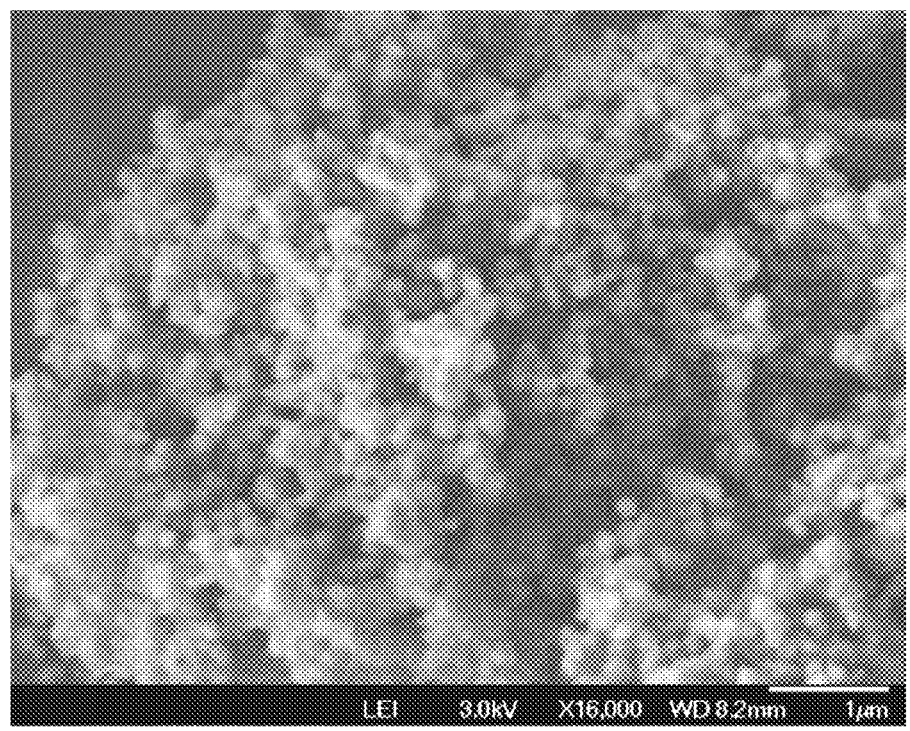
FIG. 2A is an SEM image of a pure phase CHA zeolite according to the present invention.

Samples of the dried product were analysed by XRD and SEM as described above. Analysis of the as made and calcined products by powder XRD (FIG. 1) indicated that the product had a CHA structure. An SEM image of the as-made product (FIG. 2a) showed that the material has crystal size of ~50-100 nm, which is much smaller than CHA crystals (2-5 microns, FIG. 2b) prepared by conventional fluoride route with similar gel compositions (Example 2b). The $N_2$ measurement of the calcined product showed that the product had a BET surfaces area of ~680 $m^2/g$ and a pore volume of ~0.27 $cm^3/g$. The calcined product had an SAR of about 60.

Example 2b: Reference CHA Synthesis Via TEOS and Al(i-OPr)$_3$

Figure 2B:
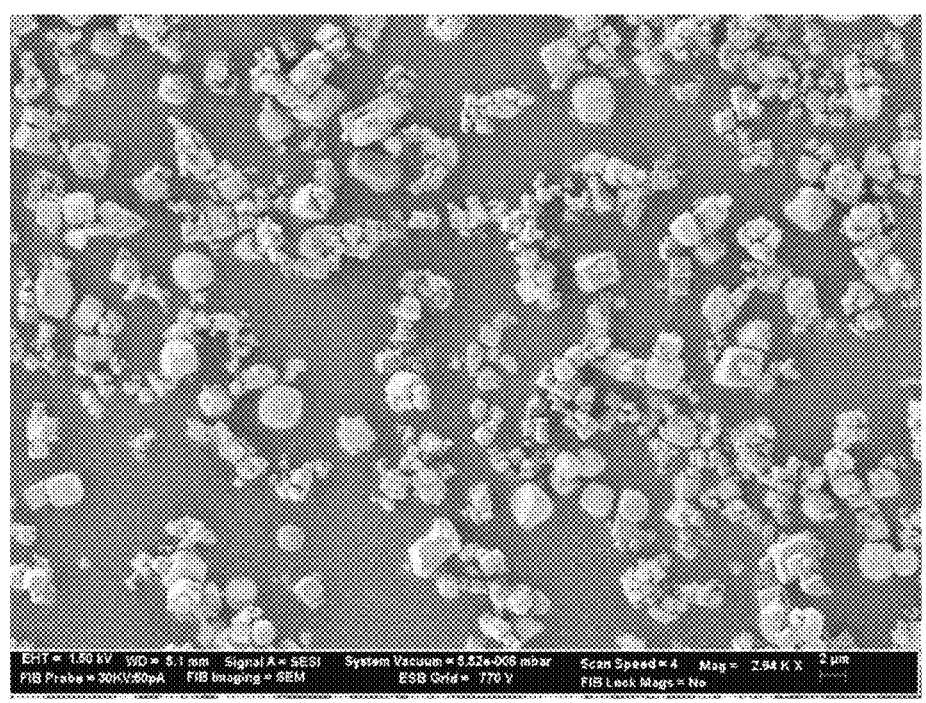
FIG. 2B is an SEM image of a reference CHA zeolite.

Al(i-OPr)$_3$) was mixed with TMAdaOH, 25 wt % and TEOS. The mixture was hydrolyzed under stirring conditions at room temperature for 6-8 h, followed by heating to about 60-70° C. to evaporate ethanol and $H_2O$. After that, HF was added, giving a final gel composition by molar ratio of $H_2O/SiO_2/Al_2O_3$/TMAda-OH/HF of 3/1/0.0167/0.5/0.5. The resulting dry gel was homogenized by hand, transferred to a 23 mL teflon lined steel autoclave and the gel was heated for 5 days at 150° C. in a tumbling oven at 40 rpm. The as-made product was calcined at 580° C./8 hours in air with ramping rate of 3° C./min. FIG. 2b is an SEM image of the as-made product.

FIG. 10 is an FT-IR spectrum of CHA (SAR-60, Example 2a) according to the present invention. The peak at about 3700-3730 cm$^{-1}$ was due to vibration modes of isolated silanol (Si—OH) groups (internal and external surfaces). As shown in FIG. 11, in contrast, the reference CHA (SAR-65, prepared in alkaline medium) has much higher intensity than the CHA according to the present invention, after both peaks were normalized using the framework vibrational overtones at 1870 cm$^{-1}$. Thus, the CHA according to the present invention has significant less silanol defects (e.g., 2-10 times less) compared to the CHA prepared in alkaline medium.

Example 3: Synthesis of CHA Via HSZ-HUA385

11.6 g of TMAda-OH, 25 wt % was mixed with 1.65 g of zeolite Y (HSZ-HUA385, Tosoh) having an SAR of ~100. The mixture was then heated to about 70° C. to evaporate ~7.5 g H$_2$O. Finally, 0.57 g HF (48%) was added dropwise to the concentrated gel and the mixture was stirred using a spatula until homogenous. The mixture was then heated at 155° C. under rotation (45 rpm) for 4 days. The pH range of the reaction mixture was about 6 to about 8.

To obtain the CHA powder product, the autoclaves were cooled to room temperature in air and the crystalline product was recovered by filtration, washed several times with deionized water and dried at 80° C. overnight in a drying oven. The as-made product was calcined at 580° C. for 8 hours in air with ramping rate of 3° C./min.

Example 4: Synthesis of MFI Via CBV760

10.5 g of TPA-OH, 40 wt % was mixed with 2.5 g of zeolite Y (CBV760, Zeolyst) having an SAR of ~60. The mixture was then heated to about 70° C. to evaporate ~3 g H$_2$O. Finally, 0.86 g HF (48%) was added dropwise to the concentrated gel and the mixture was stirred using a spatula until homogenous. The mixture was then heated at 175° C. under static condition for 5 days. The pH range of the reaction mixture was about 6 to about 8.

Figure 3:
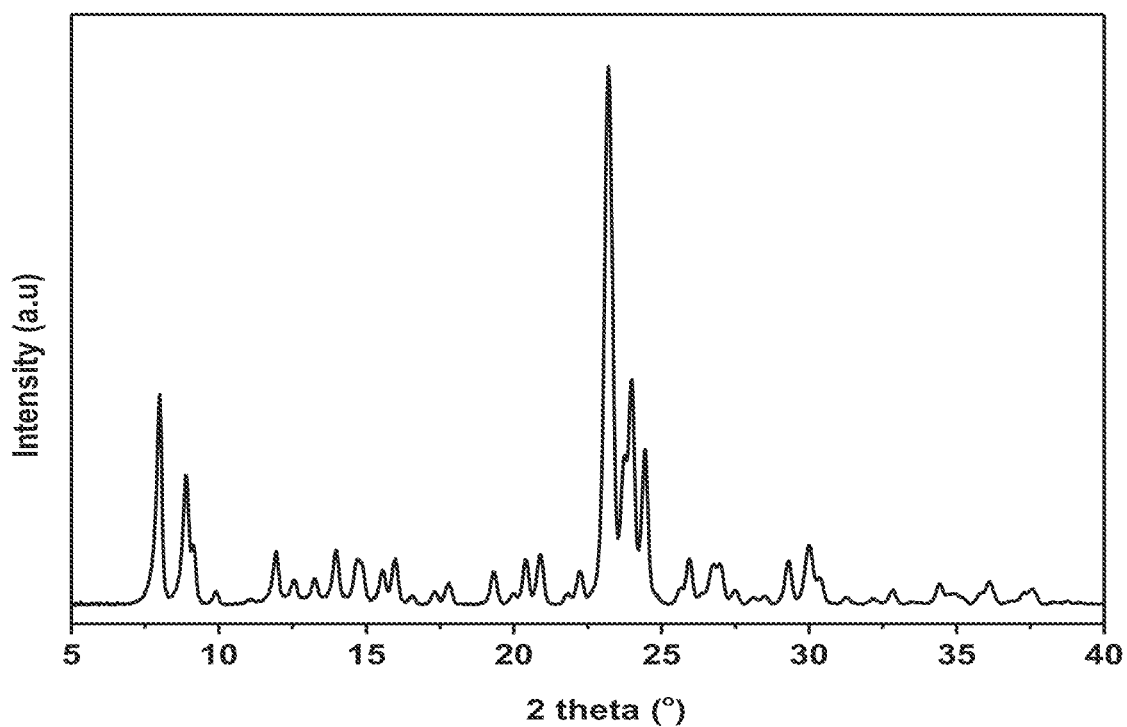
FIG. 3 is an XRD pattern of a pure phase MFI zeolite prepared in Example 4.

To obtain the MFI powder product, the autoclaves were cooled to room temperature in air and the crystalline product was recovered by filtration, washed several times with deionized water and dried at 80° C. overnight in a drying oven. The as-made product was calcined at 580° C. for 8 hours in air with ramping rate of 3° C./min. Analysis of the as made product by powder XRD (FIG. 3) indicated that the product had a MFI structure.

Example 5: Synthesis of BEA Via CBV760

11.2 g of TEA-OH, 35 wt % was mixed with 2.95 g of zeolite Y (CBV 760, Zeolyst) having an SAR of ~60. The mixture was then heated to about 70° C. to evaporate ~1.2 g H$_2$O. Finally, 1.2 g HF (48%) was added dropwise to the concentrated gel mixture and the mixture was stirred by a spatula until homogenous. The mixture was then heated at 155° C. under rotation (45 rpm) for 7 days. The pH range of the reaction mixture was about 6 to about 8.

To obtain the BEA powder product, the autoclaves were cooled to room temperature in air and the crystalline product was recovered by filtration, washed several times with deionized water and dried at 80° C. overnight in a drying oven. The as-made product was calcined at 580° C./8 hours in air with ramping rate of 3° C./min.

Figure 4:
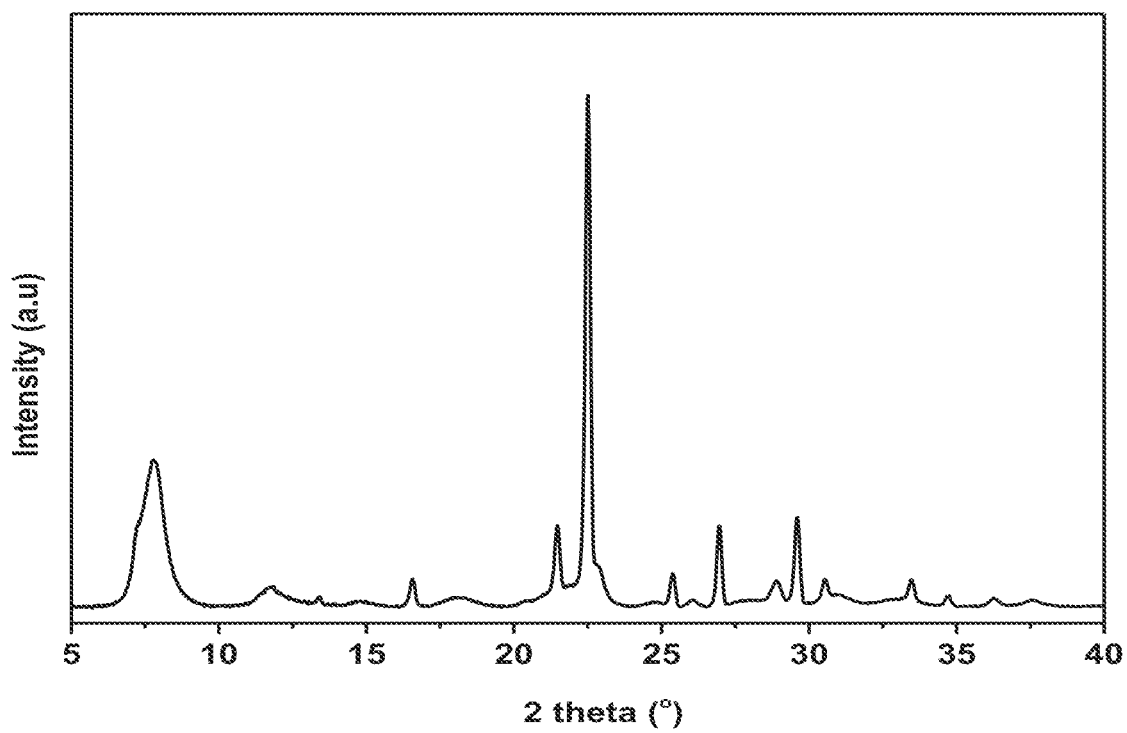
FIG. 4 is an XRD pattern of a pure phase BEA zeolite prepared in Example 5.
Figure 5:
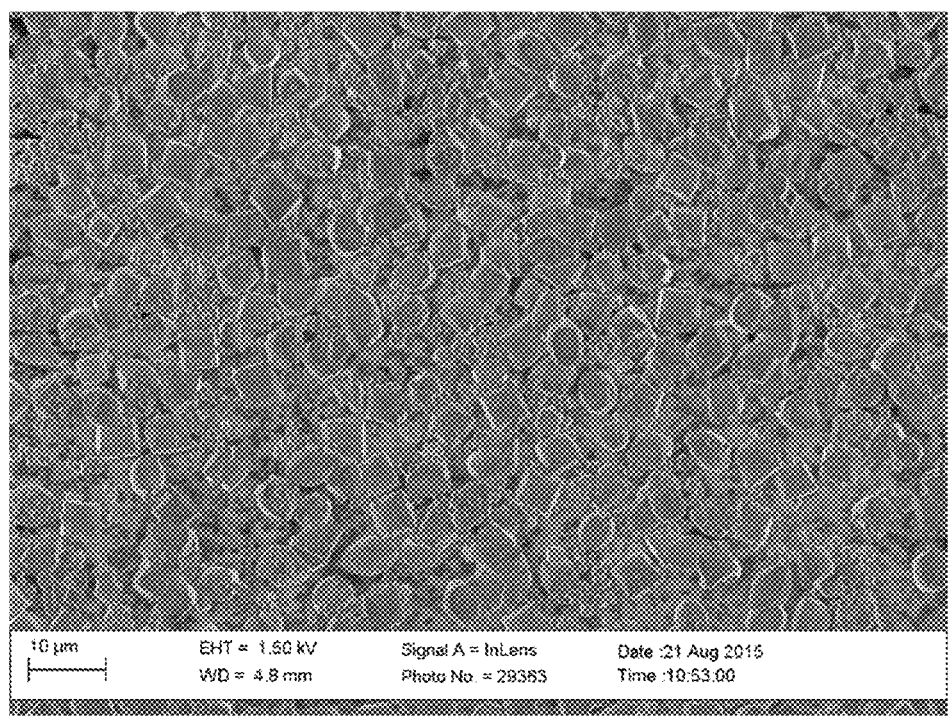
FIG. 5 is an SEM image of a pure phase BEA zeolite prepared in Example 5.

Samples of the dried product were analysed by XRD and SEM as described above. Analysis of the as-made and calcined products by powder XRD (FIG. 4) indicated that the product had a BEA structure. An SEM image of the as-made BEA showed that the material has crystal size of about 5 μm (FIG. 5). N$_2$ adsorption measurements of the calcined product showed that the product had a BET surfaces area of ~600 m$^2$/g and a pore volume of ~0.21 cm$^3$/g. The calcined product had an SAR of about 60.

Example 6: Synthesis of ITW Via CBV780

Figure 6:
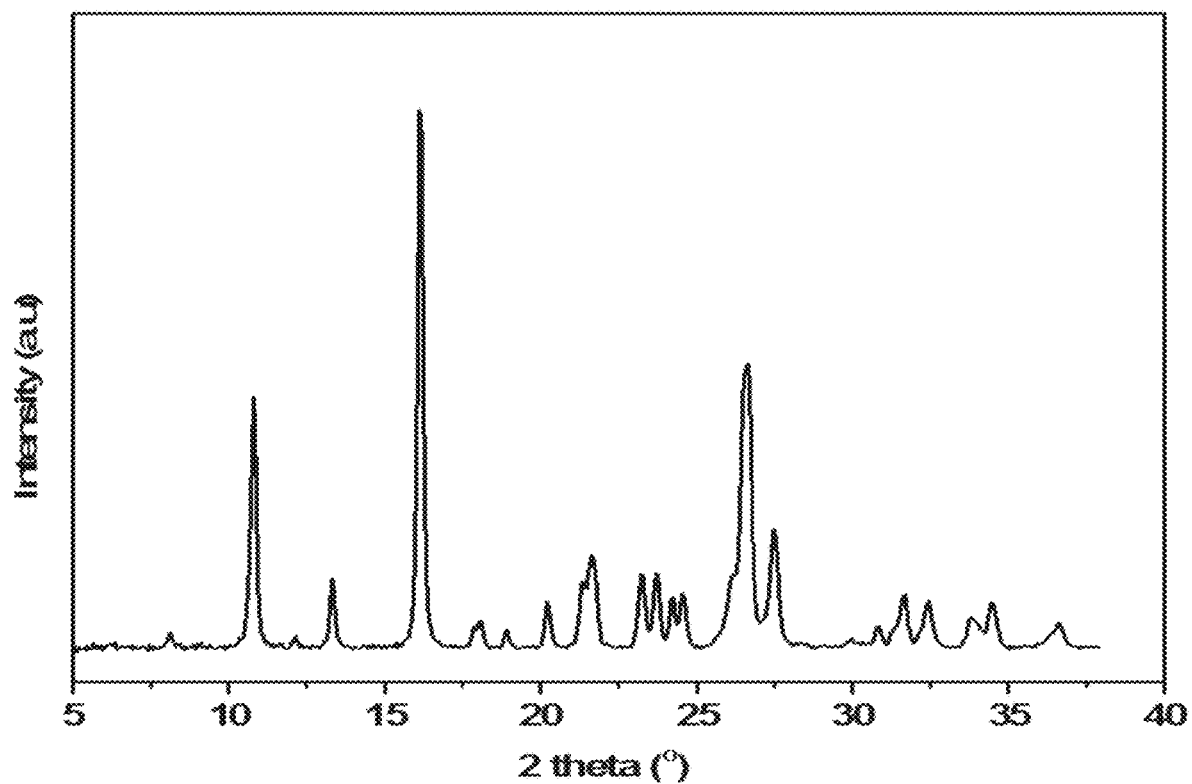
FIG. 6 is an XRD pattern of a pure phase ITW zeolite prepared in Example 6.
Figure 7:
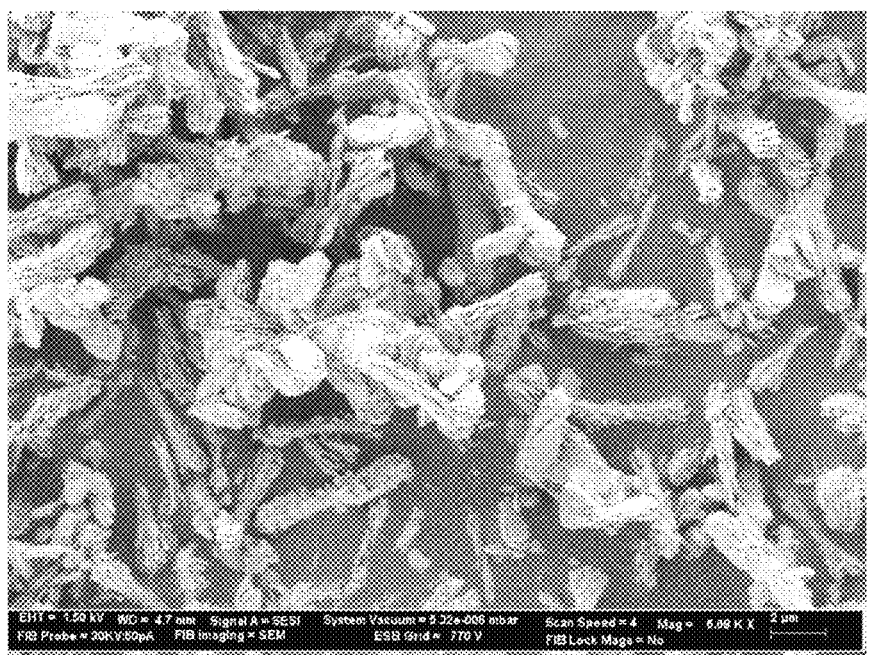
FIG. 7 is an SEM image of a pure phase ITW zeolite prepared in Example 6.

ITW (SAR-80) was prepared by a similar method as described in Examples 1-5, in which 1,2.3TMI-OH was the organic structure directing agent, and CBV780 was the only Si and Al source. The final gel with molar composition of H$_2$O:SiO$_2$:Al$_2$O$_3$:1,2,3-TMI-OH:HF=7:1:0.0125:0.5:0.5 was rotated in the oven at 150° C. for 7 days. Analysis of the as made product by powder XRD (FIG. 6) indicated that the product had a ITW structure, and the sample has rod-like morphology (SEM image as shown in FIG. 7).

Example 7: Synthesis of STW Via CBV780

Figure 8:
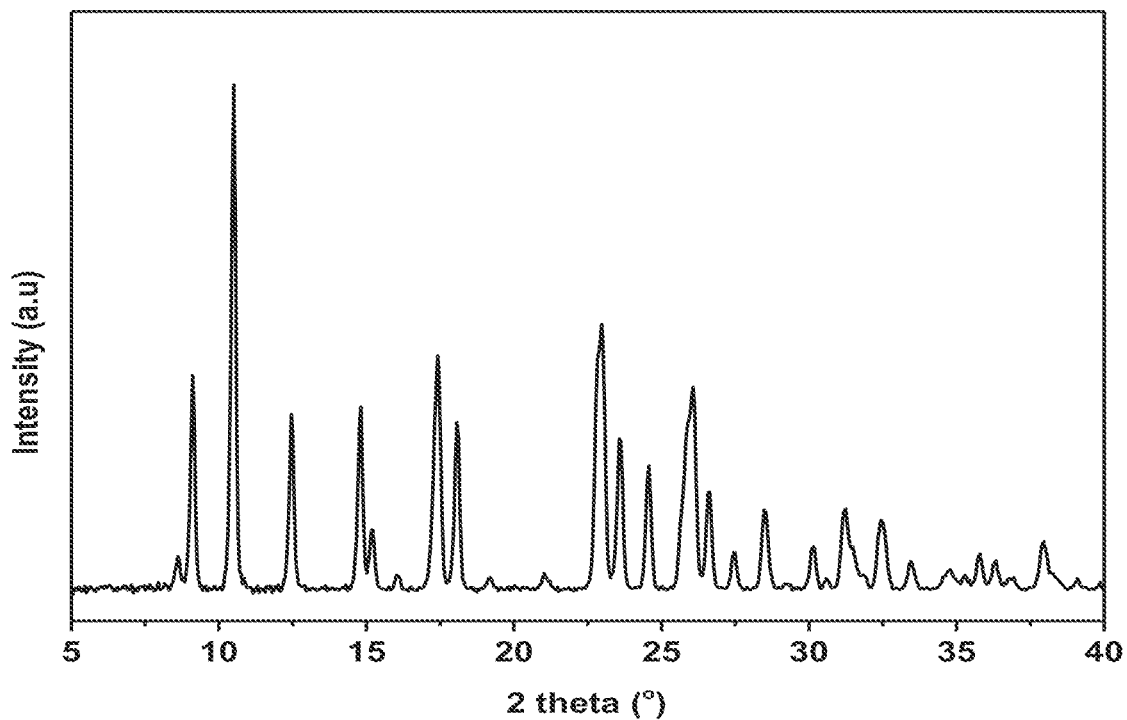
FIG. 8 is an XRD pattern of a pure phase STW zeolite prepared in Example 7.
Figure 9:
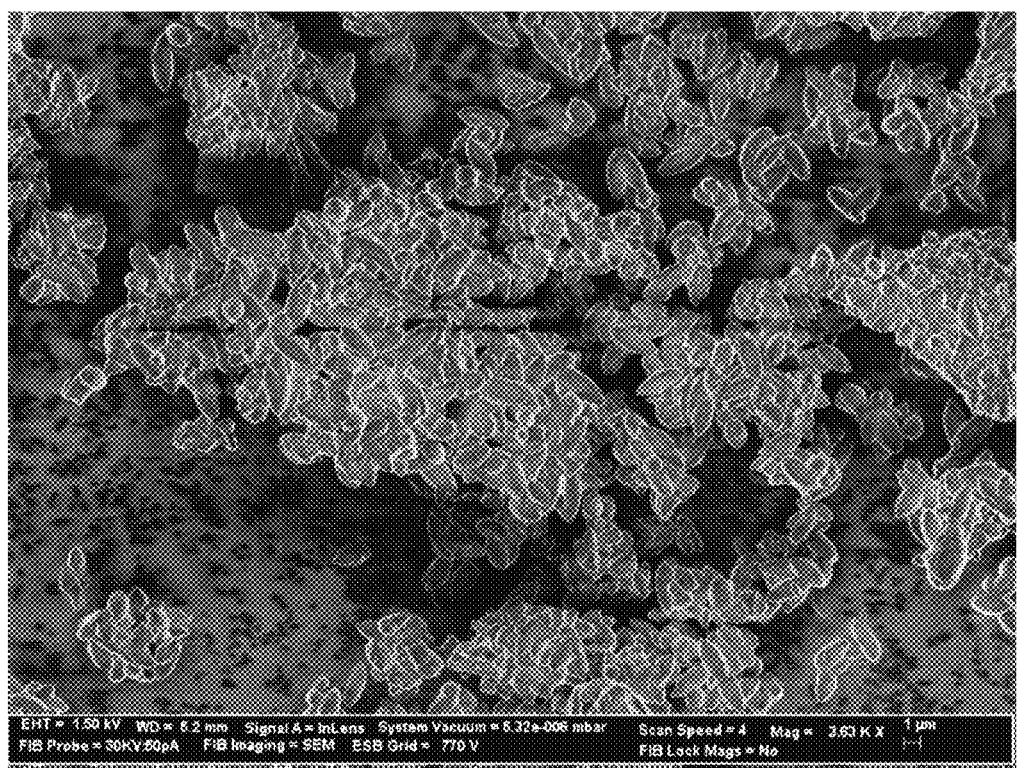
FIG. 9 is an SEM image of a pure phase STW zeolite prepared in Example 7.

STW (SAR-80) was prepared by a similar method as described in Examples 1-5, in which 2E134TMI-OH was the organic structure directing agent, and CBV780 was the only Si and Al source. The final gel with molar composition of H$_2$O:SiO$_2$:Al$_2$O$_3$:2E134TMI-OH:HF=4:1:0.0125:0.5:0.5 (5% wt of STW seed was added) was rotated in the oven at 160° C. for 7 days. Analysis of the as made product by powder XRD (FIG. 8) indicated that the product had a STW structure, and the sample has bipyramidal hexagonal rods morphology (SEM image as shown in FIG. 9).

The above examples are set forth to aid in the understanding of the disclosure, and are not intended and should not be construed to limit in any way the disclosure set forth in the claims which follow hereafter. Although illustrated and herein described with reference to certain specific embodiments, the present disclosure is nevertheless not intended to be limited to the details shown, but various modifications may be made therein without departing from the spirit of the disclosure.

The invention claimed is:

1. An aluminosilicate zeolite comprising at least about 90% phase pure CHA framework and the aluminosilicate zeolite has an FT-IR spectrum according to FIG. 10.

2. The aluminosilicate zeolite of claim 1, wherein the aluminosilicate zeolite has at least about 95% phase pure CHA framework.

3. An aluminosilicate zeolite comprising at least about 95% phase pure CHA framework, wherein the aluminosilicate zeolite, according to its FT-IR spectrum, has an intensity ratio of less than about 5 between frequencies of about 3730 cm$^{-1}$ and about 1870 cm$^{-1}$.

4. The aluminosilicate zeolite of claim 3, wherein the aluminosilicate zeolite has the intensity ratio ranges of about 1:10 to about 5:1 between frequencies of about 3730 cm$^{-1}$ and about 1870 cm$^{-1}$.

5. The aluminosilicate zeolite of claim 3, wherein the aluminosilicate zeolite has a mean crystal size of less than about 3 μm.

6. The aluminosilicate zeolite of claim 3, wherein the aluminosilicate zeolite has an SAR of about 20 to about 500.

7. The aluminosilicate zeolite of claim 3, wherein the aluminosilicate zeolite is substantially free of alkaline metal.

8. A method for storing $NO_x$ comprising contacting an exhaust gas stream containing $NO_x$ with an aluminosilicate zeolite of claim 3.

9. A method for selectively reducing $NO_x$ comprising contacting an exhaust gas stream containing NOx with an aluminosilicate zeolite of claim 3.

10. A method for oxidizing a component of an exhaust gas comprising contacting an exhaust gas stream containing the component with an aluminosilicate zeolite of claim 3, wherein the component is selected from CO, hydrocarbon, and $NH_3$.

* * * * *